(12) United States Patent
Zou

(10) Patent No.: US 10,533,599 B2
(45) Date of Patent: Jan. 14, 2020

(54) EXPANSION SCREW AND LOCKING METHOD USING THE EXPANSION SCREW

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ting-Jian Zou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 15/808,812

(22) Filed: Nov. 9, 2017

(65) Prior Publication Data
US 2019/0063484 A1    Feb. 28, 2019

(30) Foreign Application Priority Data
Aug. 25, 2017    (CN) .......................... 2017 1 0745006

(51) Int. Cl.
| F16B 13/04 | (2006.01) |
| F16B 39/02 | (2006.01) |
| F16B 5/02 | (2006.01) |
| F16B 33/00 | (2006.01) |

(52) U.S. Cl.
CPC ............ F16B 39/02 (2013.01); F16B 5/0241 (2013.01); F16B 5/0266 (2013.01); F16B 33/004 (2013.01)

(58) Field of Classification Search
USPC ..................................... 411/19, 134
See application file for complete search history.

(56) References Cited

U.S. PATENT DOCUMENTS

| 2,324,520 | A | * | 7/1943 | Lamson | ................ A61F 2/0013 |
| | | | | | 600/32 |
| 3,129,726 | A | * | 4/1964 | Moore | ...................... F16K 7/10 |
| | | | | | 138/90 |
| 3,213,672 | A | * | 10/1965 | Orr | .......................... F01P 11/00 |
| | | | | | 73/45.8 |
| 4,954,017 | A | * | 9/1990 | Davis | .................... E21D 21/004 |
| | | | | | 405/259.3 |
| 5,353,841 | A | * | 10/1994 | Mathison | ............ F16L 55/1108 |
| | | | | | 138/90 |
| 5,771,937 | A | * | 6/1998 | Collins | ..................... F16K 7/10 |
| | | | | | 138/89 |
| 6,629,486 | B2 | * | 10/2003 | Forys | ..................... B64G 1/641 |
| | | | | | 411/434 |
| 7,140,824 | B2 | * | 11/2006 | Bucknell | ................. B25B 29/02 |
| | | | | | 411/14.5 |

(Continued)

*Primary Examiner* — Gary W Estremsky
(74) *Attorney, Agent, or Firm* — ScienBiziP, P.C.

(57) ABSTRACT

An non-loosening and vibration-proof expanding screw includes a screw cap defining a receiving cavity, and a rod body connected to the screw cap. The rod body defines a hollow cavity, a sealing ring, and an air inlet pipe. The sealing ring includes a main body with a receiving hole and an internal ventilation pipe. The internal ventilation pipe includes interconnected first and second holes. The air inlet pipe is received in the first hole and gas under pressure can be introduced into the hollow cavity through the second hole. Thus the expanding screw can be inflated to expand and thereby lock the expanding screw and a securable object together, or be deflated to allow its release.

7 Claims, 7 Drawing Sheets

(56) References Cited

U.S. PATENT DOCUMENTS 7,597,118 B1 * 10/2009 Peterson .............. F16L 55/1286
137/224
9,903,489 B2 * 2/2018 Cole ....................... F16K 15/20

* cited by examiner

EXPANSION SCREW AND LOCKING METHOD USING THE EXPANSION SCREW

CROSS-REFERENCE TO RELATED APPLICATIONS

This application claims priority to Chinese Patent Application No. 201710745006.5 filed on Aug. 25, 2017, the contents of which are incorporated by reference herein.

FIELD

The subject matter herein generally relates to a screw, and particularly, to an expansion screw and a locking method using the expansion screw.

BACKGROUND

A screw mounted on an object is easily loosed and can fall off when the object vibrates. Thus, an expansion screw and a locking method using the expansion screw are provided to solve the above problem.

BRIEF DESCRIPTION OF THE DRAWINGS

Implementations of the present disclosure will now be described, by way of example only, with reference to the attached figures.

DETAILED DESCRIPTION

Figure 1:
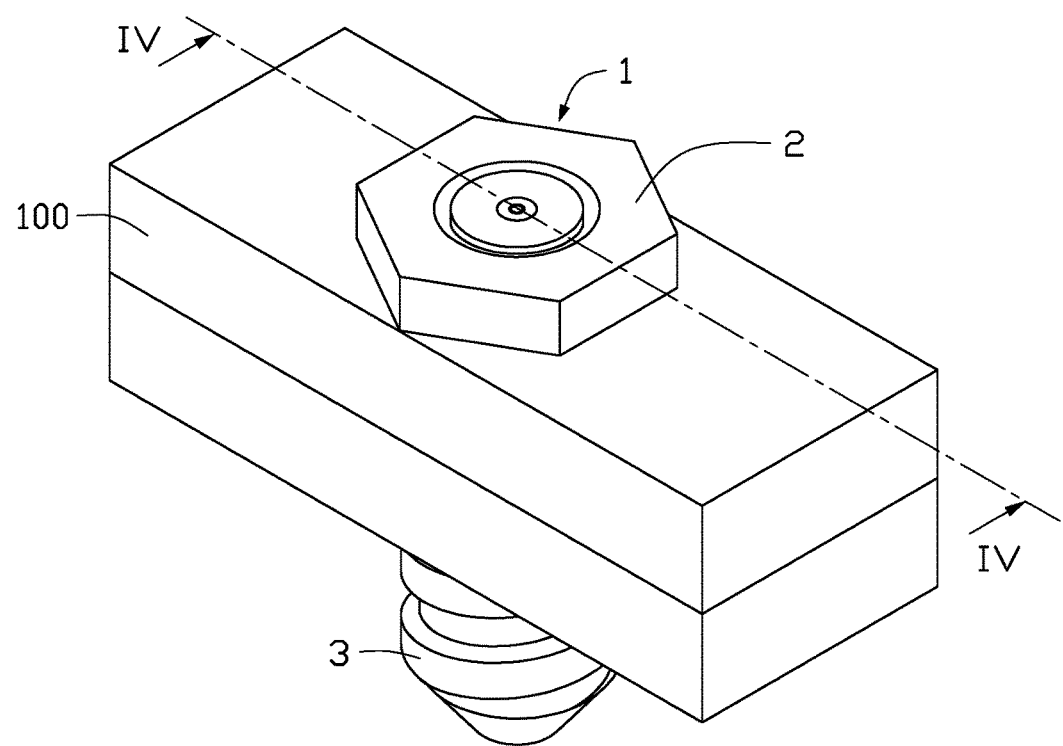
FIG. 1 is an isometric view showing an exemplary embodiment of an expansion screw.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

Figure 2:
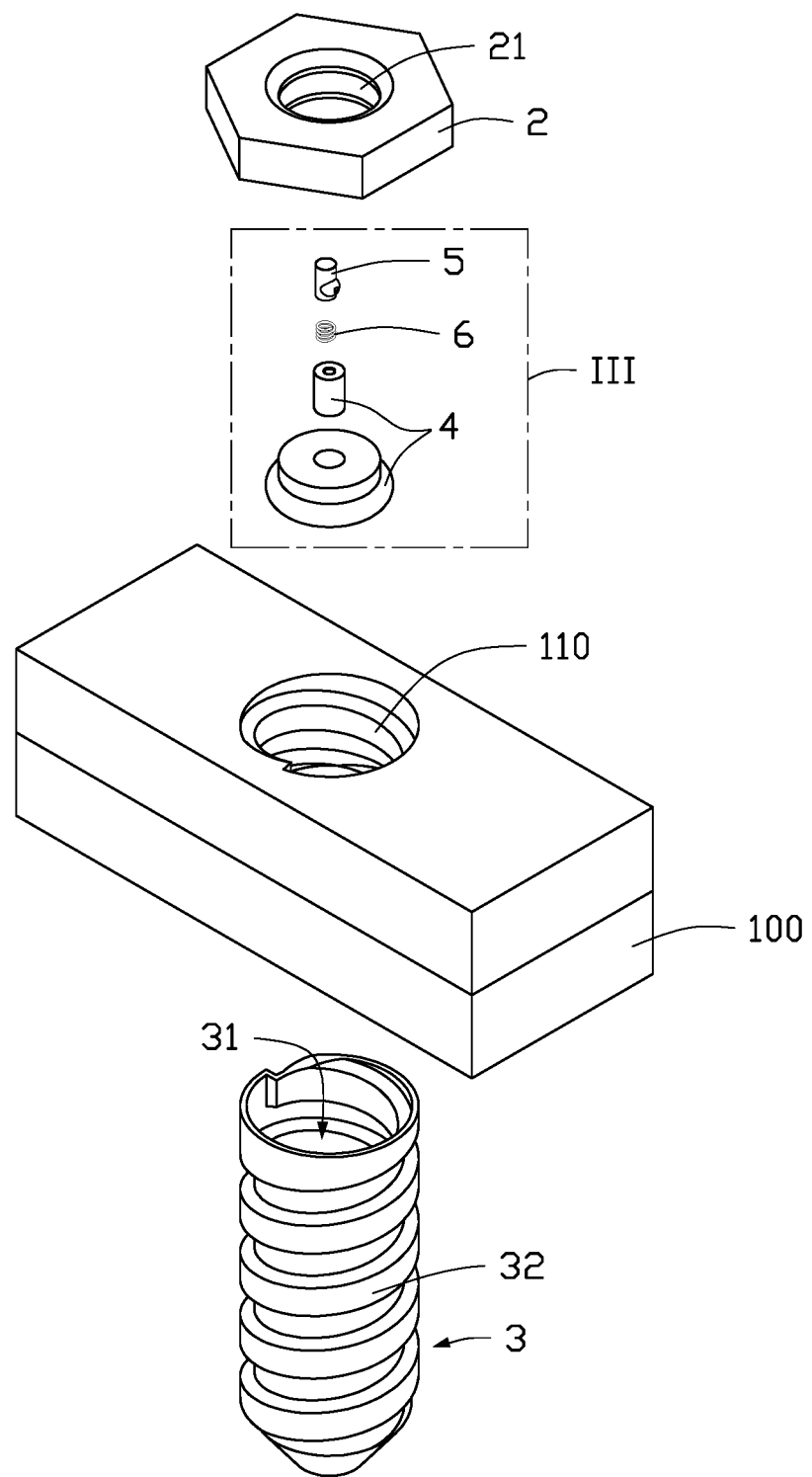
FIG. 2 is an exploded, isometric view of the expansion screw of FIG. 1.
Figure 3:
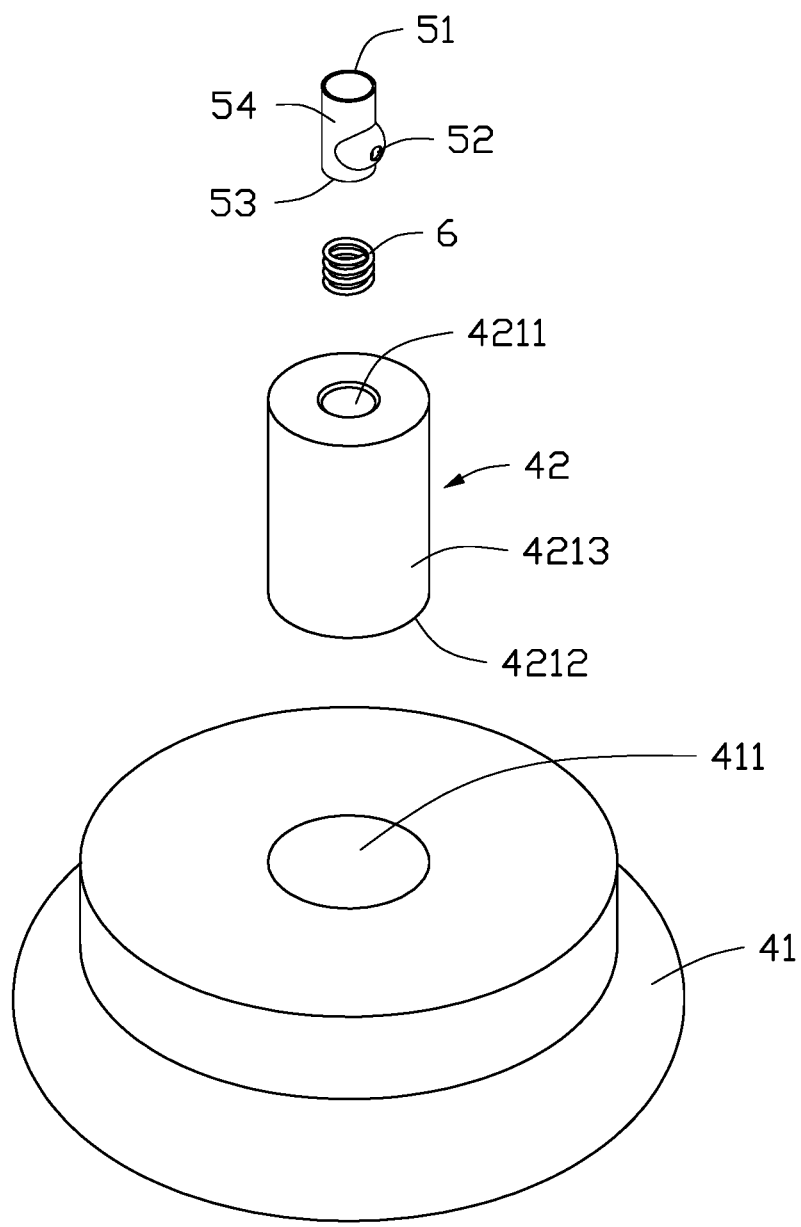
FIG. 3 is an enlarged view of region III of FIG. 2.

FIG. 1 illustrates an exemplary embodiment of an expansion screw 1. The expansion screw 1 is inserted into an object 100 to lock the object 100. The expansion screw 1 includes a screw cap 2 and a rod body 3 connected to the screw cap 2. In at least one exemplary embodiment, the screw cap 2 and the rod body 3 are integrally formed. The screw cap 2 and the rod body 3 are made of plastic material. The plastic material can be rubber. FIG. 2 illustrates an exploded, isometric view of the expansion screw 1 of FIG. 1, and FIG. 3 illustrates an enlarged view of region III of FIG. 2. The expansion screw 1 further includes a sealing ring 4, an air inlet pipe 5, and an elastic piece 6. The screw cap 2 defines a receiving cavity 21. The sealing ring 4 is received in the receiving cavity 21. In at least one exemplary embodiment, the receiving cavity 21 is set in the center position of the screw cap 2. The receiving cavity 21 is matched with the sealing ring 4.

Figure 4:
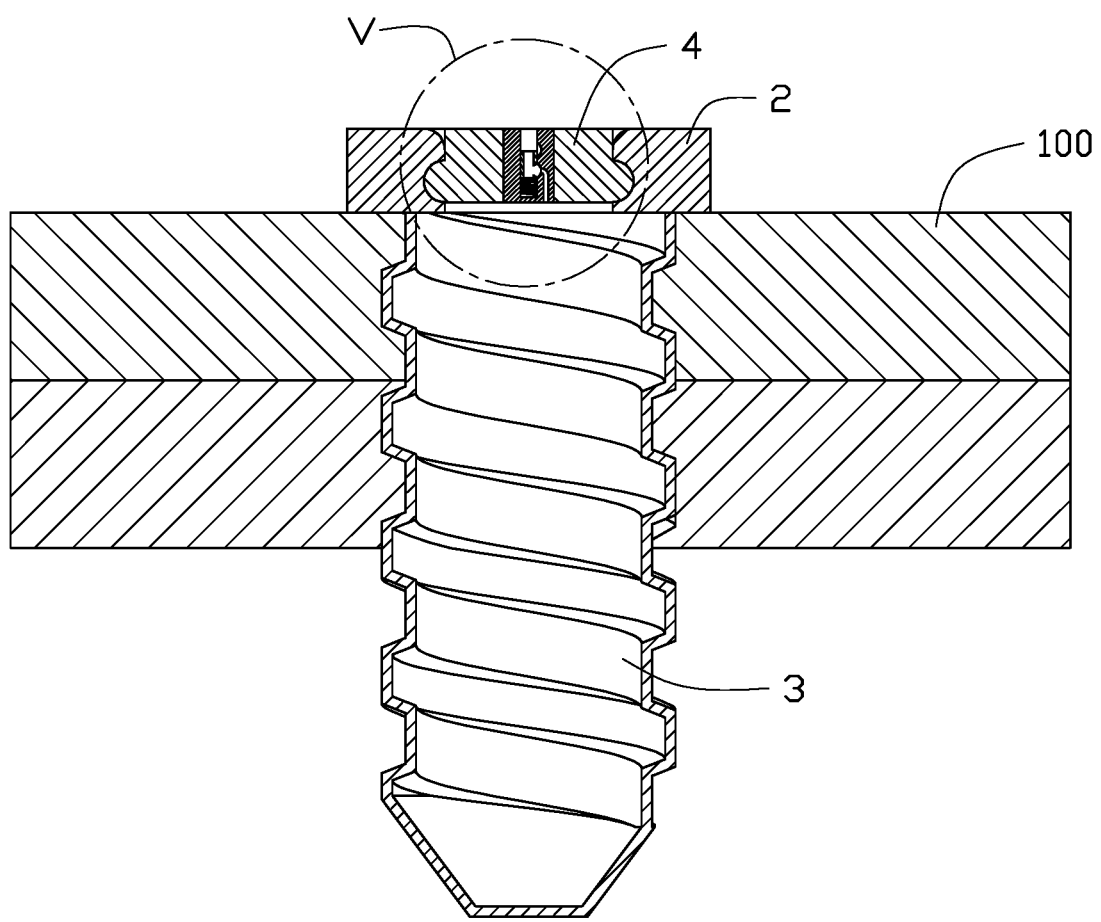
FIG. 4 is a cross-sectional view taken along the line IV-IV of FIG. 1.
Figure 5:
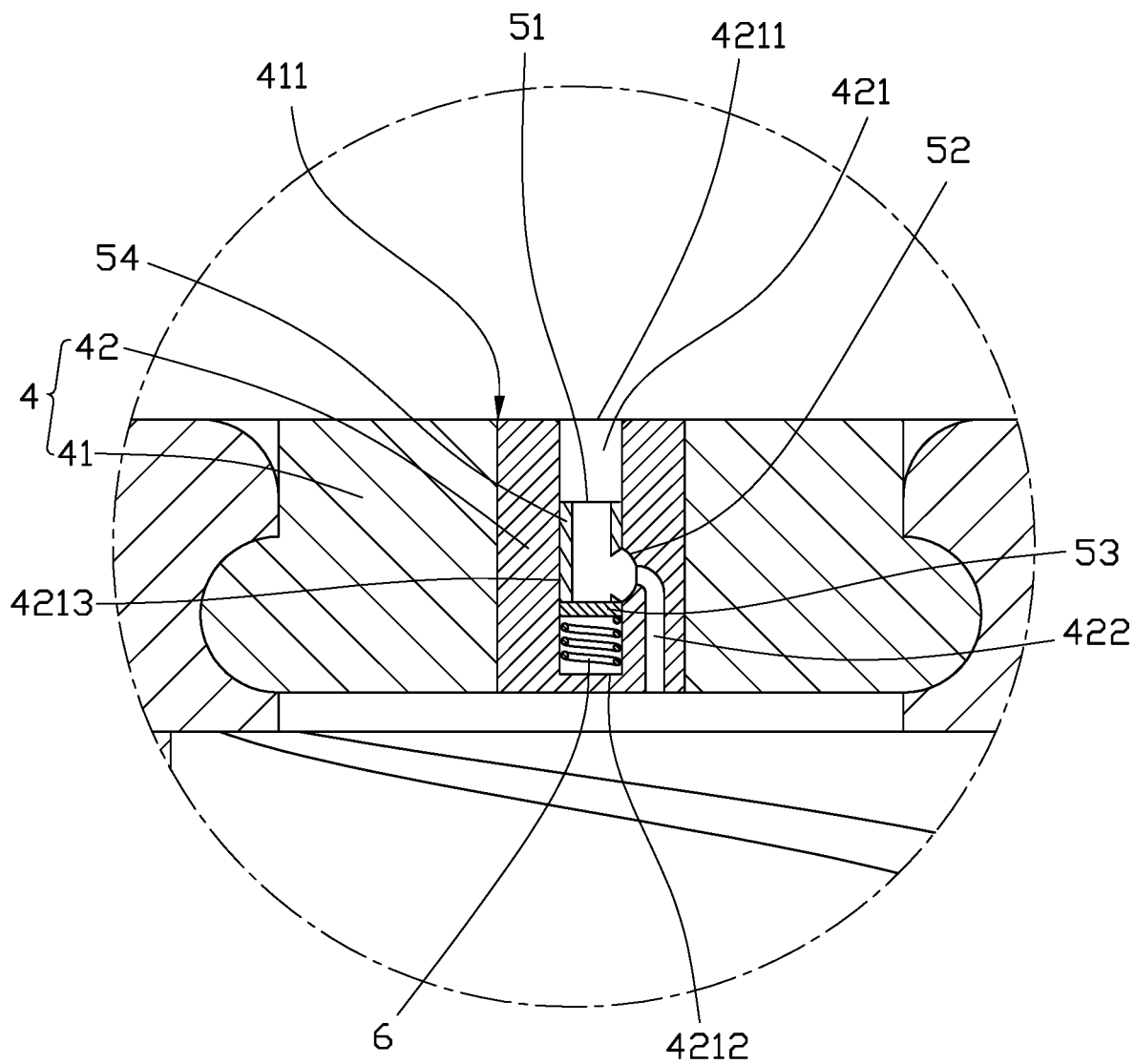
FIG. 5 is an enlarged view of region V of FIG. 4.

Please refer to FIGS. 4-5, the sealing ring 4 includes a main body 41 and an internal ventilation pipe 42. A receiving hole 411 is set in the center position of the main body 41. The internal ventilation pipe 42 is received in the receiving hole 411. The internal ventilation pipe 42 includes a first hole 421 and a second hole 422. The first hole 421 is connected to the second hole 422. The air inlet pipe 5 is received in the first hole 421. The air inlet pipe 5 is further connected to the first hole 421 through the elastic piece 6. In at least one exemplary embodiment, the first hole 421 includes a first opening 4211, a first bottom wall 4212, and a first side wall 4213. The first side wall 4213 connects to the first bottom wall 4212 and the first opening 4211. The second hole 422 is embedded in the first side wall 4213.

The air inlet pipe 5 includes a second opening 51, an air hole 52, a second bottom wall 53, and a second side wall 54. The second opening 51 faces the first opening 4211. The second side wall 54 connects to the second bottom wall 53 and the second opening 51. The air hole 52 is set on the second side wall 54.

In at least one exemplary embodiment, one end of the elastic piece 6 connects to the first bottom wall 4212 of the first hole 421, the other end of the elastic piece 6 connects to the second bottom wall 53 of the air inlet pipe 5 (referring to FIG. 5). Thus, the air inlet pipe 5 is able to connect to the first hole 421 of the sealing ring 4 through the elastic piece 6. In at least one exemplary embodiment, the elastic piece 6 can be a spiral spring.

In at least one exemplary embodiment, the rod body 3 includes a hollow cavity 31 (referring to FIG. 2). The air hole 52 of the air inlet pipe 5 communicates with the hollow cavity 31 through the second hole 422. In at least one exemplary embodiment, the outer surface of the rod body 3 defines a screw thread 32.

Figure 6:
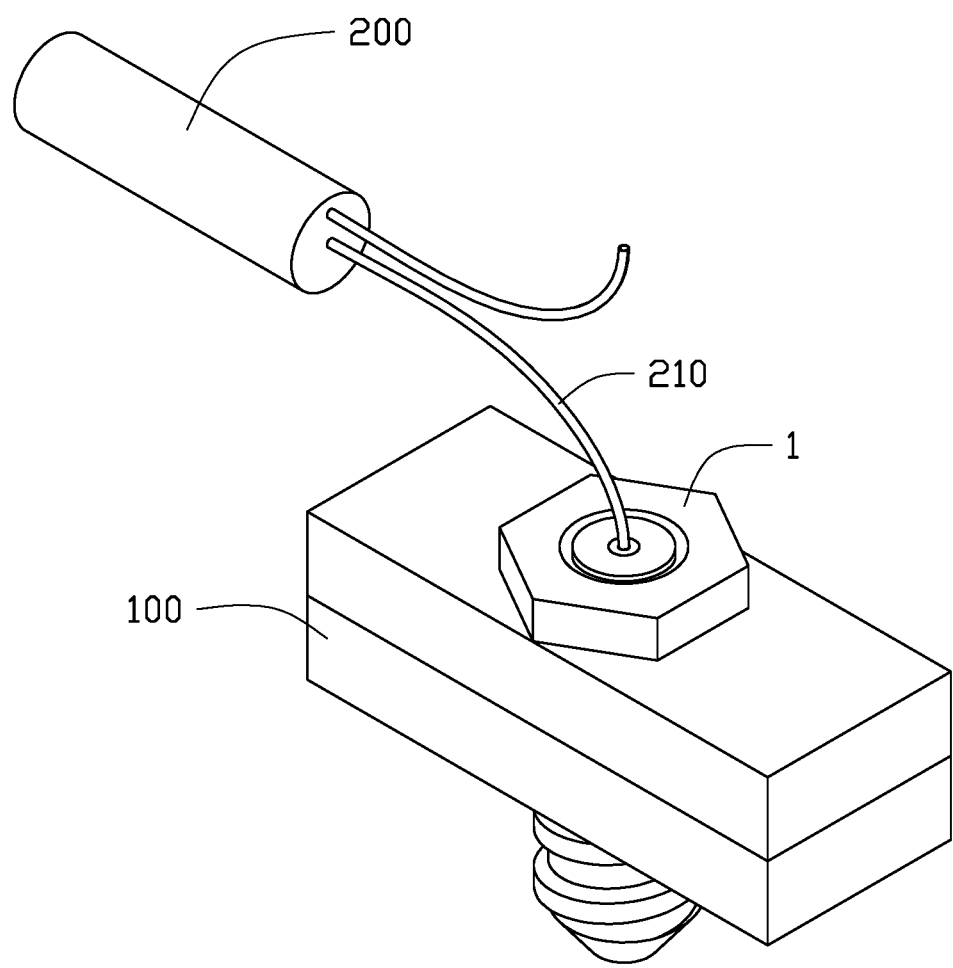
FIG. 6 is an isometric view showing a cylinder inflating the expansion screw of FIG. 1.
Figure 7:
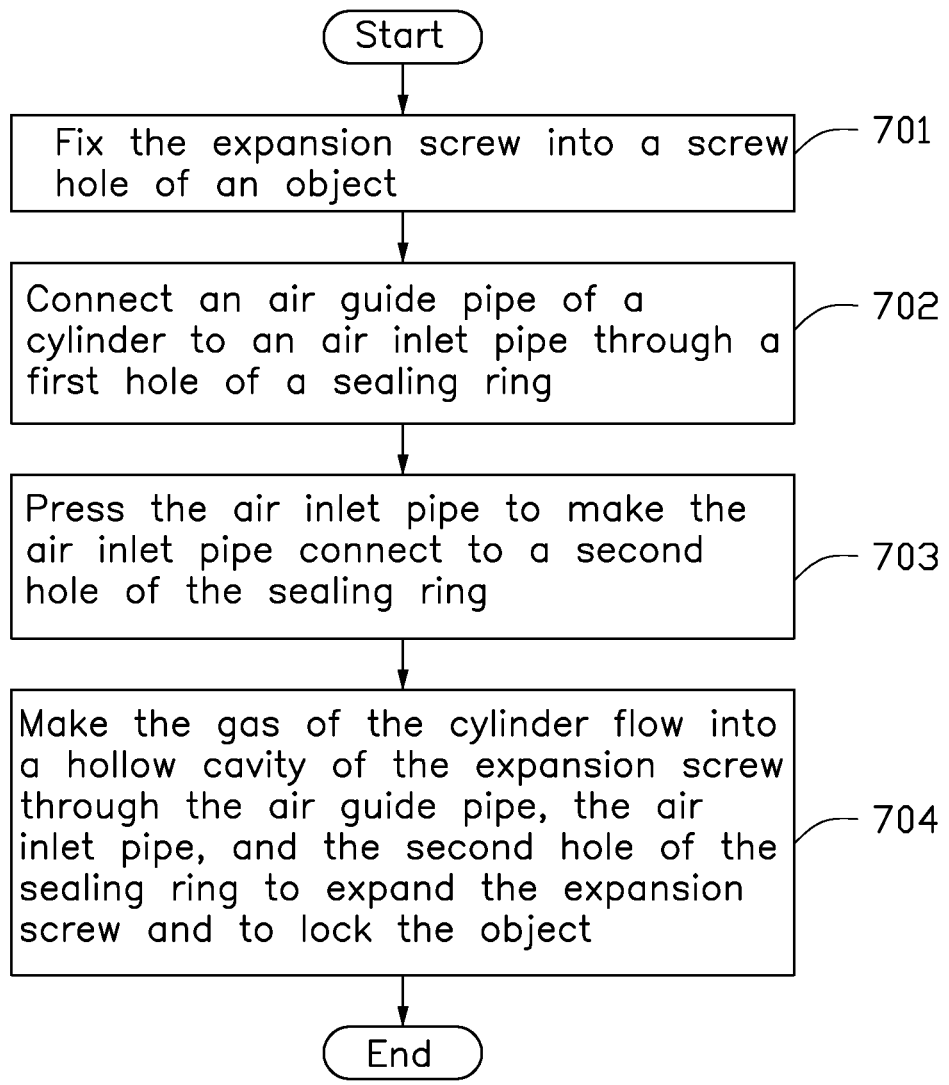
FIG. 7 is a flowchart of an embodiment of a locking method using the expansion screw of FIG. 1.

FIG. 6 illustrates a cylinder 200 inflating the expansion screw 1. The cylinder 200 includes an air guide pipe 210. FIG. 7 illustrates a flowchart of an exemplary embodiment of a locking method. The method is provided by way of example, as there are a variety of ways to carry out the method. The method described below can be carried out using the configurations illustrated in FIGS. 1-6, for example, and various elements of these figures are referenced in explaining the example method. Each block shown in FIG. 7 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 701.

At block 701, an expansion screw is fixed into a screw hole of an object.

At block 702, an air guide pipe of a cylinder is connected to an air inlet pipe through a first hole 421 of a sealing ring 4.

At block 703, the air inlet pipe is pressed to make the air inlet pipe connect to a second hole of the sealing ring 4.

At block 704, the gas of the cylinder flows into a hollow cavity of the expansion screw through the air guide pipe, the air inlet pipe, and the second hole of the sealing ring to expand the expansion screw and to lock the object.

In at least one exemplary embodiment, the gas of the hollow cavity is extracted by the cylinder through the air guide pipe, the air inlet pipe, and the second hole, to deflate the expansion screw. Thus, the expansion screw is unlocked from the object.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including, the full extent established by the broad general meaning of the terms used in the claims.

What is claimed is:

1. An expansion screw comprising:
   a screw cap defining a receiving cavity;
   a rod body connected to the screw cap, the rod body defining a hollow cavity;
   a sealing ring received in the receiving cavity; and
   an air inlet pipe;
   wherein, the sealing ring comprises a main body and an internal ventilation pipe, the main body defines a receiving hole, the internal ventilation pipe is received in the receiving hole, the internal ventilation pipe comprises a first hole and a second hole, the first hole is connected to the second hole, the first hole comprises a first opening, the air inlet pipe is received in the first hole, the air inlet pipe comprises a second opening and an air hole, the second opening faces the first opening, the air hole of the air inlet pipe communicates with the hollow cavity through the second hole, wherein the expansion screw comprises an elastic piece, the air inlet pipe is connected to the first hole through the elastic piece, the first hole further comprises a first bottom wall and a first side wall, the first side wall connects to the first bottom wall and the first opening, the second hole is embedded in the first side wall.

2. The expansion screw as recited in claim 1, wherein the air inlet pipe comprises a second bottom wall and a second side wall, the second side wall connects to the second bottom wall and the second opening, the air hole is set on the second side wall.

3. The expansion screw as recited in claim 2, wherein one end of the elastic piece connects to the first bottom wall of the first hole, the other end of the elastic piece connects to the second bottom wall of the air inlet pipe.

4. The expansion screw as recited in claim 1, wherein the elastic piece can be a spiral spring.

5. The expansion screw as recited in claim 1, wherein the screw cap and the rod body are made of plastic material.

6. The expansion screw as recited in claim 1, wherein an outer surface of the rod body defines a screw thread.

7. The expansion screw as recited in claim 1, wherein the receiving cavity is matched with the sealing ring.

* * * * *